United States Patent
Chung et al.

(10) Patent No.: US 11,790,690 B1
(45) Date of Patent: Oct. 17, 2023

(54) FINGERPRINT RECOGNITION DEVICE, FINGERPRINT RECOGNITION METHOD AND METHOD OF GENERATING MOIRE PATTERN IMAGE

(71) Applicant: NOVATEK Microelectronics Corp., Hsin-Chu (TW)

(72) Inventors: Jung-Chen Chung, Hsinchu County (TW); Shu-Fang Wang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/990,752

(22) Filed: Nov. 21, 2022

(51) Int. Cl.
*G06V 40/13* (2022.01)
*G06V 40/12* (2022.01)
*G06V 10/22* (2022.01)
*G06V 10/145* (2022.01)

(52) U.S. Cl.
CPC ........ *G06V 40/1318* (2022.01); *G06V 10/145* (2022.01); *G06V 10/235* (2022.01); *G06V 40/1347* (2022.01)

(58) Field of Classification Search
CPC ............. G06V 40/1318; G06V 10/235; G06V 10/145; G06V 40/1347
See application file for complete search history.

(56) References Cited

U.S. PATENT DOCUMENTS

| 9,459,747 B2 | 10/2016 | Donnelly | |
| 2020/0050828 A1* | 2/2020 | Li | G06T 5/002 |
| 2020/0184171 A1* | 6/2020 | Lee | G06V 40/1376 |
| 2021/0012083 A1* | 1/2021 | Kim | G06V 40/1318 |
| 2021/0264575 A1* | 8/2021 | Zhang | G06T 5/20 |

FOREIGN PATENT DOCUMENTS

| CN | 115147881 A | | 10/2022 |
| JP | 2014174803 A | * | 9/2014 |
| TW | 202244757 A | | 11/2022 |

OTHER PUBLICATIONS

English translation of JP 2014174803A (Year: 2014).*

* cited by examiner

*Primary Examiner* — Lixi C Simpson
(74) *Attorney, Agent, or Firm* — Winston Hsu (57) ABSTRACT

A fingerprint recognition device is provided. The fingerprint recognition device includes a fingerprint sensing circuit and an image processing circuit. The fingerprint sensing circuit is configured to perform a first fingerprint sensing operation to obtain a first fingerprint image. The image processing circuit is coupled to the fingerprint sensing circuit and configured to generate a de-moire fingerprint image according to a moire pattern image and the first fingerprint image and perform a fingerprint recognition process according to the de-moire fingerprint image.

25 Claims, 11 Drawing Sheets

FINGERPRINT RECOGNITION DEVICE, FINGERPRINT RECOGNITION METHOD AND METHOD OF GENERATING MOIRE PATTERN IMAGE

BACKGROUND OF THE INVENTION

1. Field of the Invention

The present invention relates to a fingerprint recognition device, a fingerprint recognition method and a method of generating moire pattern image, and more particularly, to a fingerprint recognition device, a fingerprint recognition method and a method of generating moire pattern image capable of providing de-moire fingerprint image with low moire pattern or moire-pattern-free.

2. Description of the Prior Art

Fingerprint recognition technology is widely applied in a variety of electronic products for realizing identity recognition. Fingerprint recognition allows a user to perform identity recognition conveniently. For example, a user only needs to put his/her finger on a fingerprint sensing device of the electronic device to login instead of manually entering long and tedious username and password. Moreover, an optical fingerprint sensing scheme is commonly applied to the electronic product having a display panel. Please refer to FIG. 1, which is a schematic diagram illustrating a fingerprint recognition device using an under-display (also called under-screen) optical fingerprint sensing module 1. The under-display optical fingerprint sensing module 1 is disposed under a display panel 10 and includes a lens 12 and a fingerprint sensing circuit 14, to generate a fingerprint image. The display panel 10 such as a self-illuminating OLED display panel may be used as light source to emit light towards a user's finger. The lens 12 is disposed between the display panel 10 and the fingerprint sensing circuit 14 for collecting light reflected by the finger. The reflected light passes through the gaps or openings between display pixels of the display panel 10 and then passes through the lens 12. After that, the reflected light is sensed by the fingerprint sensing circuit 14 for generating the fingerprint image. The fingerprint sensing circuit 14 is implemented as an integrated circuit (IC).

Figure 1:
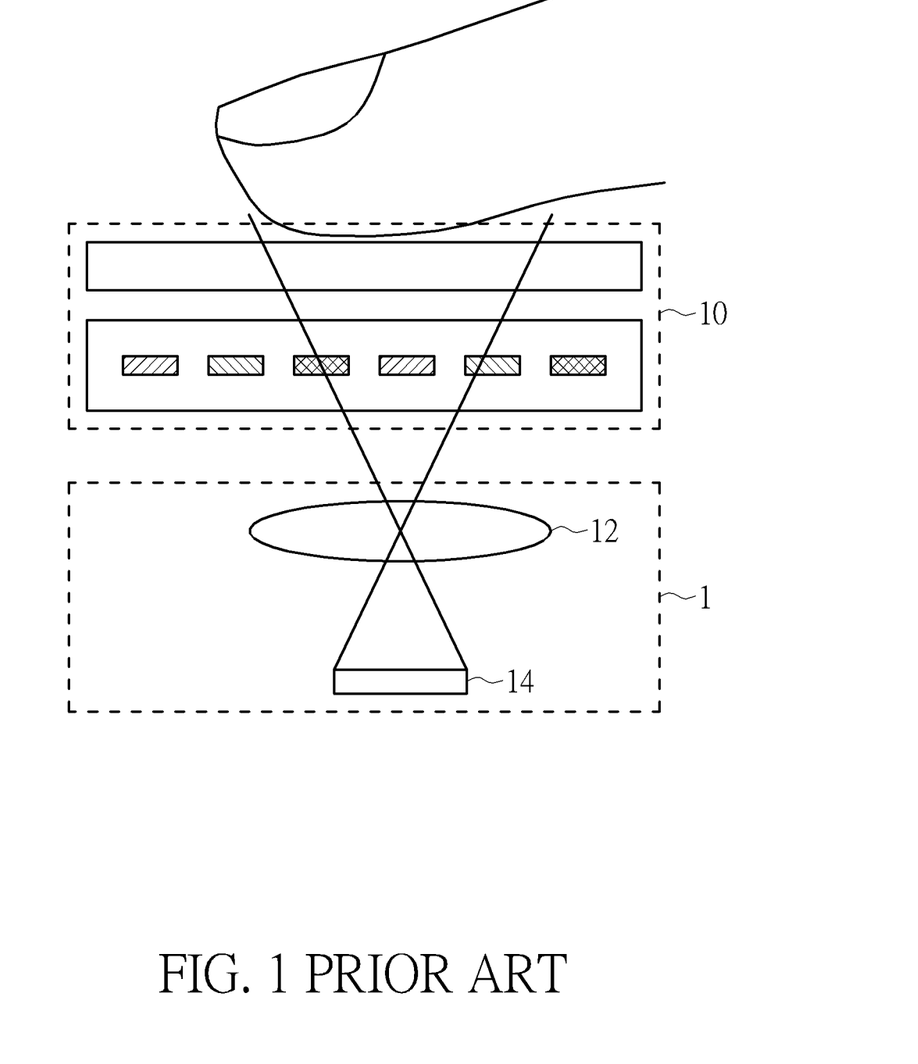
FIG. 1 is a schematic diagram illustrating an under-display optical fingerprint sensing system.
Figure 2:
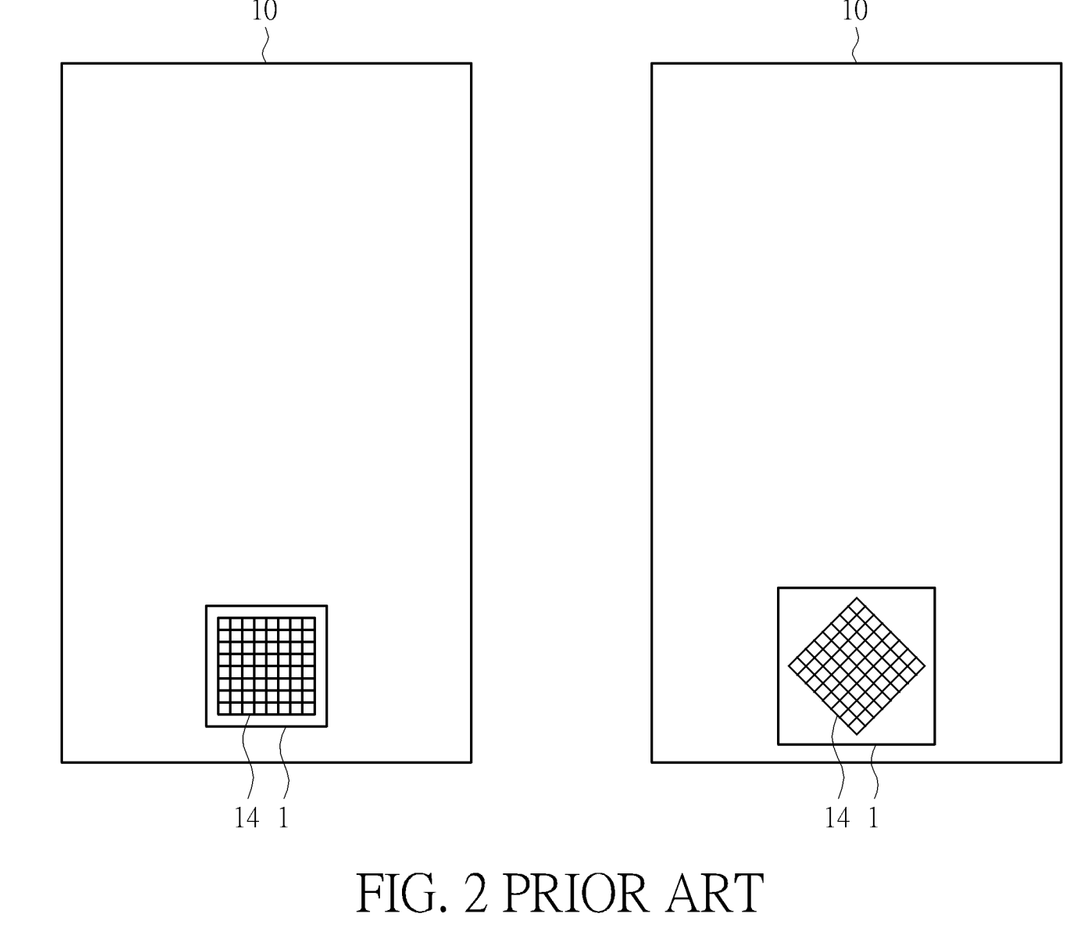
FIG. 2 is a schematic diagram illustrating the relative position relationship between a display panel and an image sensing circuit while employing rotation design.

However, since the pixel size of the display panel 10 is quite close to the pixel size of an image sensor array of the fingerprint sensing circuit 14, an unexpected interference stripe or pattern, i.e., moire pattern, may be produced after sampling, which is called moire effect. When the moire effect occurs, a fingerprint image including the moire pattern may be obtained, and thus the fingerprint may not be correctly sensed and recognized. A conventional method for reducing the moire effect is to change the relative position relationship between the display panel 10 and the image sensor array in the fingerprint sensing circuit 14 by rotating the fingerprint sensing circuit 14 by an angle (e.g., between 0 and 25 degrees) during packaging the fingerprint sensing module 1. As shown in FIG. 2, the left half of FIG. 2 shows the fingerprint sensing circuit 14 without rotation design. The right half of FIG. 2 shows the fingerprint sensing circuit 14 after employing rotation design. As shown in the right half of FIG. 2, the size of the packaged fingerprint sensing module 1 becomes larger while employing the rotation design and is not suitable for electronic products with limited space. Thus, there is a need for improvement.

SUMMARY OF THE INVENTION

It is therefore an objective of the present invention to provide a fingerprint recognition device, a fingerprint recognition method and a method of generating moire pattern image capable of providing de-moire fingerprint image with low moire pattern or moire-pattern-free to solve the abovementioned problem.

An embodiment of the present invention discloses a fingerprint recognition device comprising: a fingerprint sensing circuit, configured to perform a first fingerprint sensing operation to obtain a first fingerprint image; and an image processing circuit, coupled to the fingerprint sensing circuit and configured to generate a de-moire fingerprint image according to a moire pattern image and the first fingerprint image and perform a fingerprint recognition process according to the de-moire fingerprint image.

An embodiment of the present invention discloses a fingerprint recognition method, for a fingerprint recognition device, comprising: performing a first fingerprint sensing operation to obtain a first fingerprint image; generating a de-moire fingerprint image according to a moire pattern image and the first fingerprint image; and performing a fingerprint recognition process according to the de-moire fingerprint image.

An embodiment of the present invention discloses a method of generating a moire pattern image, comprising: receiving a fingerprint image from a fingerprint sensing circuit; performing a Fourier transform on the fingerprint image to generate a transformed fingerprint image at a first sampling rate; obtaining signal contents of the transformed fingerprint image at frequencies above one half of a second sampling rate of the transformed fingerprint image as a first intermediate signal, wherein the second sampling rate is smaller than the first sampling rate; mirroring the first intermediate signal about half of the second sampling rate to generate a second intermediate signal; and performing an inverse Fourier transform on the second intermediate signal to generate the moire pattern image, wherein the image resolution of the fingerprint image is greater than the image resolution of the moire pattern image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
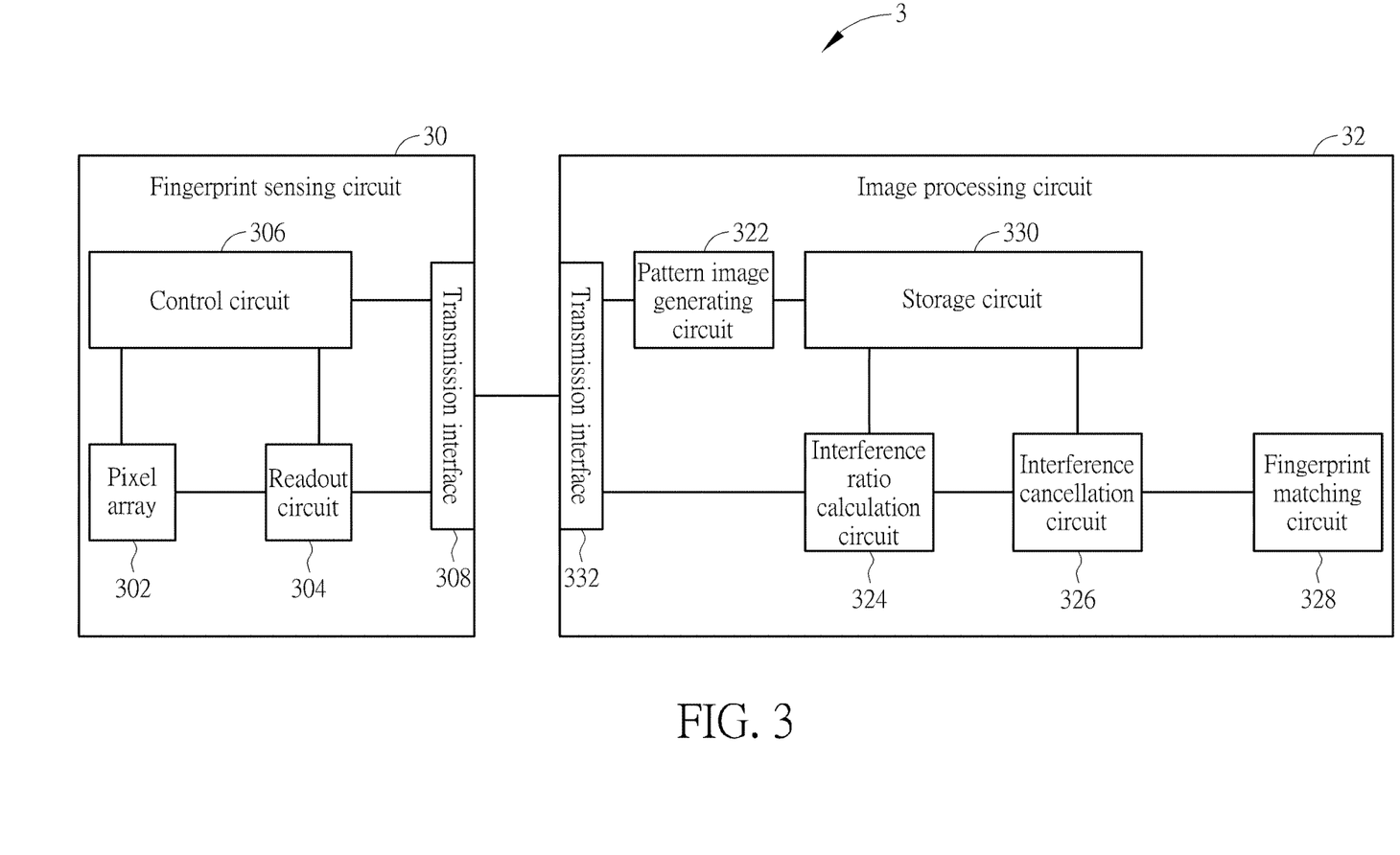
FIG. 3 is a schematic diagram of a fingerprint recognition device according to an embodiment of the present invention.

Please refer to FIG. 3, which is a schematic diagram of a fingerprint recognition device 3 according to an embodiment of the present invention. The fingerprint recognition device 3 may be a mobile phone, a tablet, laptop, a desktop, a smart phone, a wearable device or any other electronic device. The fingerprint recognition device 3 includes a display panel (not shown in FIG. 3), a fingerprint sensing circuit 30 and an image processing circuit 32. The fingerprint sensing circuit 30 is configured to perform fingerprint sensing operations to obtain fingerprint images. The fingerprint sensing circuit 30 may be utilized for performing fingerprint sensing operations to obtain fingerprint images in a manufacturing test process, a fingerprint registration process, an unlocking process or any other process required fingerprint recognition. The fingerprint sensing circuit 30 may be include a complementary metal oxide semiconductor (CMOS) image sensor (CIS), but not limited thereto. The fingerprint sensing circuit 30 may be included in an under-display fingerprint sensing module disposed under the display panel of the fingerprint recognition device 3. The display panel may be an organic light-emitting diode (OLED) panel, or the like, and utilized as a light source for fingerprint sensing. The under-display fingerprint sensing module includes the fingerprint sensing circuit 30 and a lens. The lens may be disposed above the fingerprint sensing circuit 30. The image processing circuit 32 may be an application processor in a mobile phone as the fingerprint recognition device 3, or may be a core processing unit in another fingerprint recognition device.

When a user puts his/her finger on the top of the display panel, the self-illuminating display panel emits light upwards the top of the display panel and the light may be reflected by the user's finger. The reflected light passes through the lens and may be optically sensed by the fingerprint sensing circuit 30 and accordingly the fingerprint sensing circuit 30 generates fingerprint images. The fingerprint sensing circuit 30 includes a pixel array 302, a readout circuit 304, a control circuit 306 and a transmission interface 308. The pixel array 302 is configured to receive, acquire and convert light (e.g., light reflected from user's finger), and accordingly generate pixel voltage signals. The pixel array 302 is a CMOS sensor array, but not limited thereto. The readout circuit 304 is configured to convert the pixel voltage signals into fingerprint images. The fingerprint images may be provided to the image processing circuit 32 for subsequent image processing. The readout circuit 304 may include a correlated double sampling (CDS) circuit, an analog front-end (AFE) circuit and an analog-to-digital converter (ADC), but not limited thereto.

The image processing circuit 32 is coupled to the fingerprint sensing circuit 30 and configured to generate a de-moire fingerprint image according to a moire pattern image and a first fingerprint image generated by the fingerprint sensing circuit 30. The image processing circuit 32 includes a pattern image generating circuit 322, an interference ratio calculation circuit 324, an interference cancellation circuit 326 and a fingerprint matching circuit 328, a storage circuit 330 and a transmission interface 332. The pattern image generating circuit 322 is configured to generate the moire pattern image according to a second fingerprint image generated by the fingerprint sensing circuit 30. The interference ratio calculation circuit 324 is coupled to the fingerprint sensing circuit 30 and the transmission interface 332, and configured to calculate an interference ratio according to the first fingerprint image generated by the fingerprint sensing circuit 30 and the moire pattern image. The interference cancellation circuit 326 is coupled to the interference ratio calculation circuit 324 and the transmission interface 332, and configured to generate a de-moire fingerprint image according to the first fingerprint image, the interference ratio and the moire pattern image. The fingerprint matching circuit 328 is configured to perform a fingerprint recognition process according to the de-moire fingerprint image. For example, the fingerprint matching circuit 328 is configured to compare the de-moire fingerprint image with a known and registered fingerprint image (i.e. an authorized fingerprint image) and determine whether the de-moire fingerprint image matches the authorized fingerprint. The storage circuit 330 is configured to store the moire pattern image. The storage circuit 330 may include a memory circuit and/or a register circuit, but not limited thereto. The transmission interfaces 308 and 332 may be serial peripheral interface (SPI), inter-integrated circuit ($I^2C$) interface, RS-232 interface, universal asynchronous receiver/transmitter (UART) interface, universal serial bus (USB) interface, mobile industry processor interface (MIPI) or any other type of transmission interface. The fingerprint sensing circuit 30 and the image processing circuit 32 may communicate with each other via the transmission interfaces 308 and 332.

Figure 4:
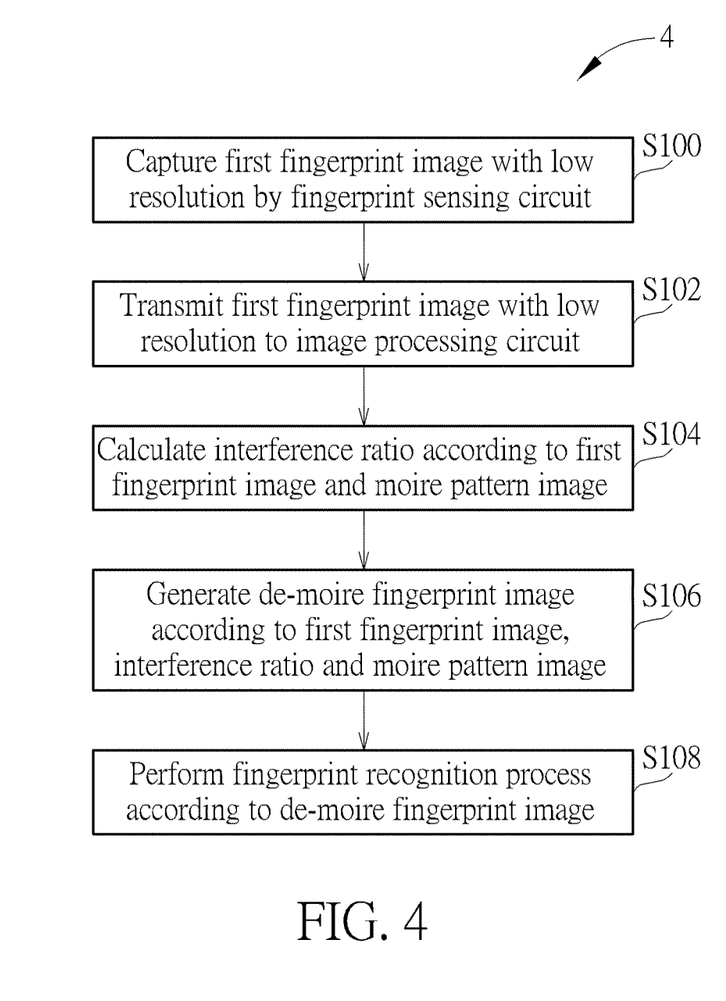
FIG. 4 is a flow diagram of an exemplary procedure according to an embodiment of the present invention.
Figure 5:
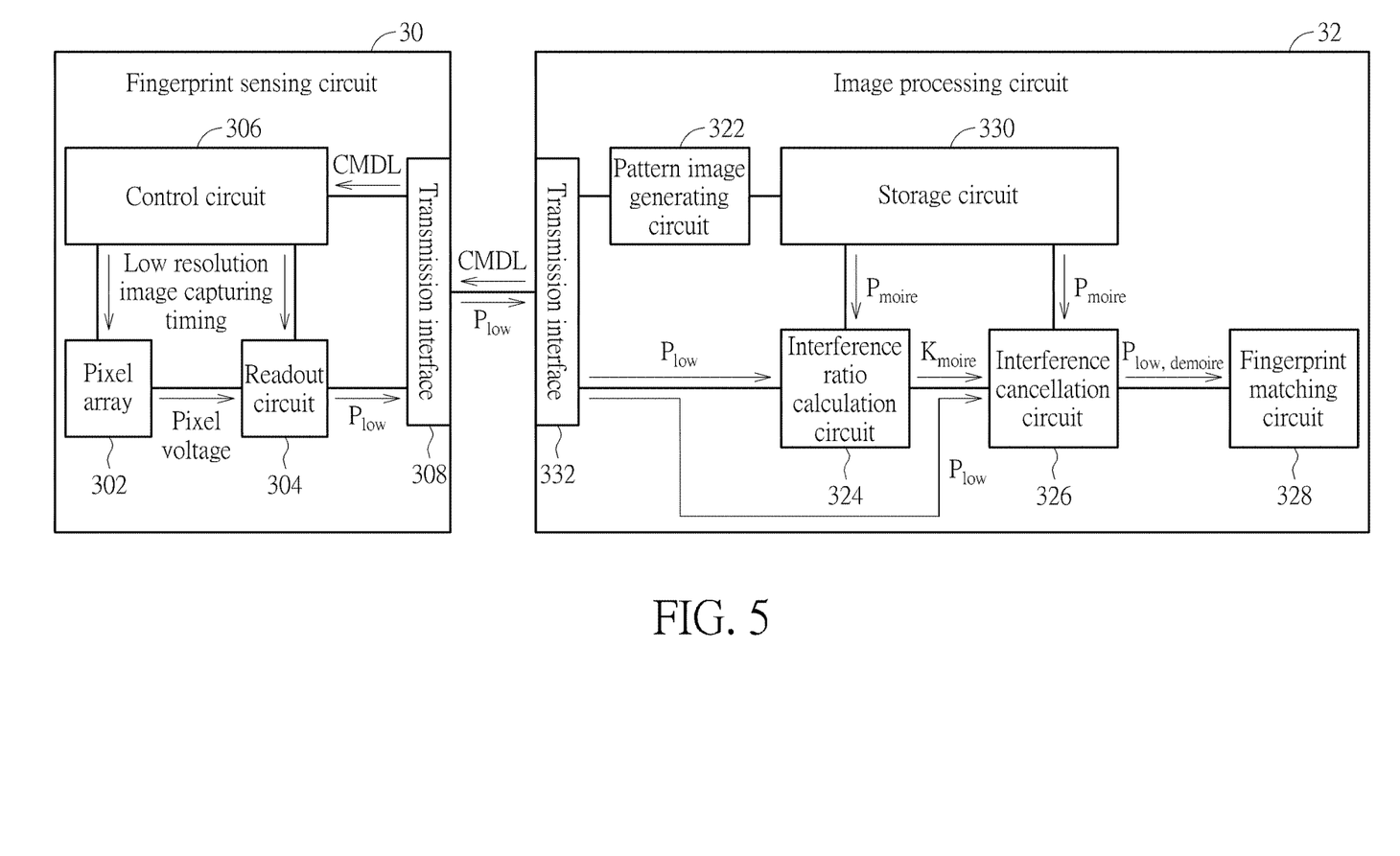
FIG. 5 is a schematic diagram illustrating operations of the fingerprint recognition device operating in an unlocking process according to an embodiment of the present invention.

For an illustration of the operations of the fingerprint recognition device 3, please refer to FIG. 4. FIG. 4 is a flow diagram of a procedure 4 according to an embodiment of the present invention. The flowchart in FIG. 4 mainly corresponds to the operations on the fingerprint recognition device 3 shown in FIG. 3. According to the procedure 4, in Step S100, when a user wants to unlock the fingerprint recognition device 3 by fingerprint recognition, the fingerprint recognition device 3 enters and operates in an unlocking process (unlocking mode). Please further refer to FIG. 4 and FIG. 5. FIG. 5 is a schematic diagram illustrating operations of the fingerprint recognition device 3 operating in an unlocking process according to an embodiment of the present invention. During the unlocking process of the fingerprint recognition device 3, the image processing circuit 32 sends a low resolution fingerprint image capturing command CMDL to the fingerprint sensing circuit 30 via the transmission interface 332. The control circuit 306 receives the low resolution fingerprint image capturing command CMDL via the transmission interfaces 308. The fingerprint sensing circuit 30 is configured to perform a first fingerprint sensing operation in response to the low resolution fingerprint image capturing command CMDL, to obtain a first fingerprint image (referred to as $P_{low}$ shown FIG. 5). The first fingerprint sensing operation is operated in the unlocking process for unlocking the fingerprint recognition device 3. In the first fingerprint sensing operation, the control circuit 306 controls to the pixel array 302 and the readout circuit 304 according to a low resolution image capturing timing scheme, and the low resolution image capturing timing scheme is regarding to control signals provided by the control unit 306 which allow the pixel array 302 and the readout circuit 304 to generate the low-resolution first fingerprint image. Also referred to FIG. 10, for each pixel binning block, the control unit 306 may provide a reset signal rst[ ] and a plurality of transfer gate control signals tx[ ] turning on transfer switches at the same time as the aforementioned control signals to control all pixel circuits of the pixel binning block. Besides, the control unit 306 may provide other control signals regarding to sampling rate to the readout circuit 304. Under the control of the control circuit 306, the pixel array 302 acquires and converts the reflected light to generate pixel voltage signals. The readout circuit 304 converts the pixel voltage signals into the first fingerprint image with low resolution. The image resolution of the first fingerprint image may be less than a resolution that the pixel array 302 is capable to achieve at most.

In Step S102, the first fingerprint image is transmitted to the image processing circuit 32 via the transmission interfaces 308 and 332. In Step S104, the interference ratio calculation circuit 324 of the image processing circuit 32 is configured to receive the first fingerprint image generated in the unlocking process via the transmission interfaces 308 and 332. Moreover, the interference ratio calculation circuit 324 reads and obtains a moire pattern image (referred to as $P_{moire}$ shown FIG. 5) stored in the storage circuit 330. The moire pattern image is associated with a determination result of moire pattern calculated based on a second fingerprint image with high resolution. The first fingerprint image and the moire pattern image have the same image resolution. The moire pattern image may be calculated and predetermined before the unlocking process, and stored into the storage circuit 330 for the following unlocking process. The moire pattern image stored in the storage circuit 330 may be calculated and predetermined in a manufacturing test process or a fingerprint registration process. Details of generating the moire pattern image may be shown and described in the following.

The interference ratio calculation circuit 324 is configured to calculate an interference ratio ($K_{moire}$ as shown FIG. 5) according to the first fingerprint image and the moire pattern image. The interference ratio may be considered as the intensity of moire pattern in the first fingerprint image. For example, the interference ratio calculation circuit 324 is configured to perform a correlation operation on the first fingerprint image and the moire pattern image to generate the interference ratio. In an embodiment, the interference ratio may be calculated by the interference ratio calculation circuit 324 according to the following equations:

$$K_{(moire)} = \frac{\sum_{i=1}^{n}\sum_{j=1}^{m} P_{(low)i,j} * P_{(moire)i,j}}{\sum_{i=1}^{n}\sum_{j=1}^{m} P_{(moire)i,j} * P_{(moire)i,j}} \quad (1)$$

where $K_{(moire)}$ represents the interference ratio; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; and i, j, n and m are positive integers.

In another embodiment, the interference ratio may be calculated by the interference ratio calculation circuit 324 according to the following equations:

$$K_{(moire)} = N * \sum_{i=1}^{n}\sum_{j=1}^{m} P_{(low)i,j} * P_{(moire)i,j} \quad (2)$$

where $K_{(moire)}$ represents the interference ratio; N represents a first coefficient; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; and i, j, n and m are positive integers.

In Step S106, the image processing circuit 32 is configured to generate a de-moire fingerprint image according to the first fingerprint image obtained in Step S100 and a moire pattern image storage in the storage circuit 330. In more details, the interference cancellation circuit 326 is configured to receive the first fingerprint image generated in the unlocking process via the transmission interface 332, obtain the interference ratio from the interference ratio calculation circuit 324, and read the moire pattern image stored in the storage circuit 330. The interference cancellation circuit 326 is configured to generate a de-moire fingerprint image ($P_{low, demoire}$ as shown FIG. 5) according to the first fingerprint image, the interference ratio and the moire pattern image. For each pixel of the de-moire fingerprint image, the interference cancellation circuit 326 calculates a difference between a pixel value of a corresponding pixel of the first fingerprint image and a product of the interference ratio and a pixel value of the corresponding pixel of the moire pattern image to obtain a pixel value of the each pixel of the de-moire fingerprint image. The pixel value of each pixel of the de-moire fingerprint image may be calculated by the interference cancellation circuit 326 according to the following equations:

$$P_{(low,demoire)i,j} = P_{(low)i,j} - P_{(moire)i,j} * K_{(moire)} \quad (3)$$

where $P_{(low, demoire)i,j}$ represents a pixel value of a pixel at the i-th row and j-th column of the de-moire fingerprint image; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; $K_{(moire)}$ represents the interference ratio; and i, j are positive integers.

Since the moire pattern image includes the moire pattern derived from the second fingerprint image, the interference cancellation circuit 326 cancels the moire pattern component from the first fingerprint image to generate the de-moire fingerprint image. That is, the de-moire fingerprint image may be generated by subtracting the product of the moire pattern image and the interference ratio from the first fingerprint image so as to cancel out the moire pattern component in the first fingerprint image. As such, the moire pattern introduced by moire effect caused from the pixel structure of the display panel conflicting with the pixel structure of the fingerprint sensing circuit 30 may be eliminated or reduced and accordingly the interference cancellation circuit 326 provides the de-moire fingerprint image with low moire pattern or moire-pattern-free to the fingerprint matching circuit 328 for fingerprint recognition.

In Step S108, the fingerprint matching circuit 328 is configured to perform a fingerprint recognition process according to the de-moire fingerprint image. The fingerprint matching circuit 328 may compare the de-moire fingerprint image with an authorized fingerprint image and determine whether the de-moire fingerprint image matches the authorized fingerprint. As the de-moire fingerprint image processed by the interference cancellation circuit 326 matches the authorized fingerprint image, the fingerprint recognition device 3 may be unlocked.

Therefore, the embodiments of the present invention may remove the moire effect in the first fingerprint image to provide the de-moire fingerprint image with low moire pattern or moire-pattern-free, thus realizing an accurate and reliable fingerprint recognition function for unlocking process. Moreover, since the first fingerprint image generated in Step S100 is a low resolution fingerprint image, the first fingerprint image may be captured by the fingerprint sensing circuit 30 without high sampling rate and long sampling time during the unlocking process, such that the required image capturing time and power consumption may be significantly reduced. Furthermore, the data amount to be transmitted between the transmission interfaces of the fingerprint sensing circuit 30 and the image processing circuit 32 becomes less, and the data transmission time is also reduced during the unlocking process. In other words, the embodiments of the present invention not only provides an accurate and reliable fingerprint recognition, but also provide a more faster unlocking operation, thus facilitating a better user experience during the unlocking process.

Figure 6:
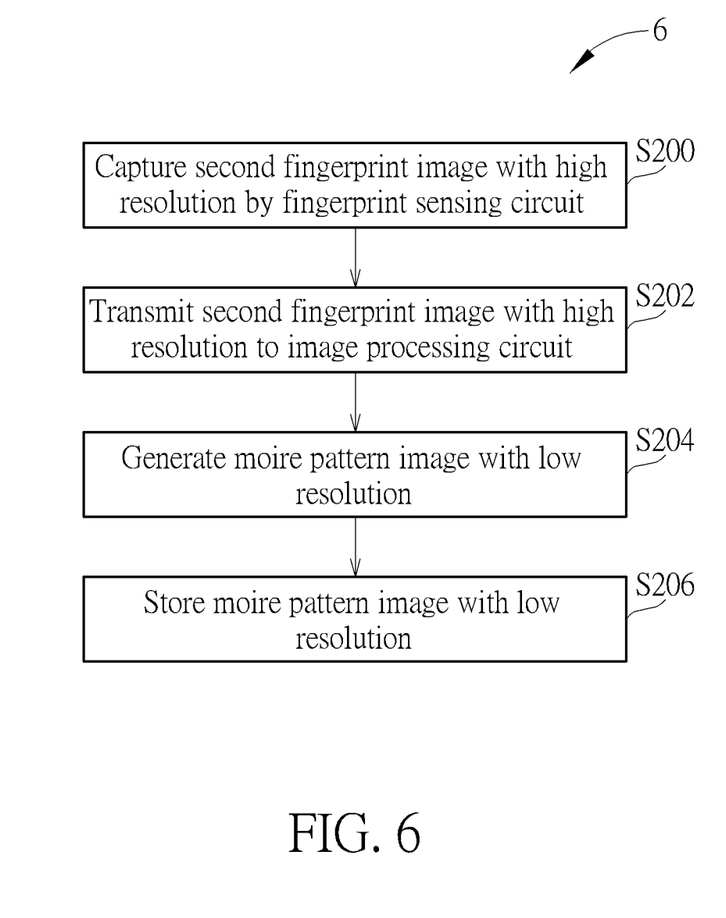
FIG. 6 is a flow diagram of a procedure for generating a moire pattern image according to an embodiment of the present invention
Figure 7:
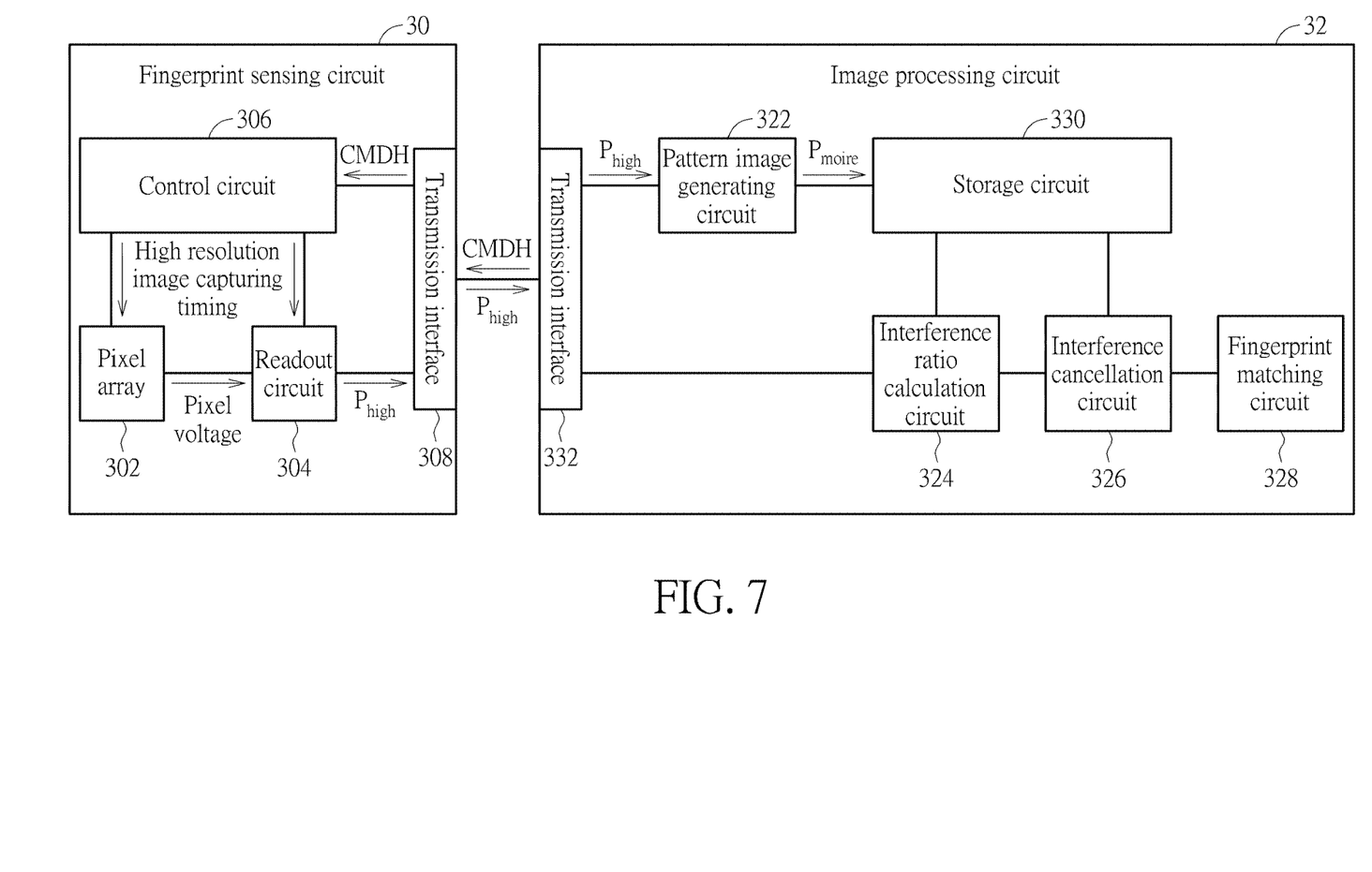
FIG. 7 is a schematic diagram illustrating operations of the fingerprint recognition device operating in a manufacturing test processor or a fingerprint registration process according to an embodiment of the present invention.

Regarding the operations of generating the moire pattern image, the method of generating the moire pattern image may be summarized in an exemplary procedure 6. Please refer to FIG. 6 and FIG. 7. FIG. 6 is a flow diagram of the procedure 6 for generating the moire pattern image according to an embodiment of the present invention. FIG. 7 is a schematic diagram illustrating operations of the fingerprint recognition device for generating the moire pattern image while operating in a manufacturing test process or a fingerprint registration process according to an embodiment of the present invention. The moire pattern image stored in the storage circuit 330 may be calculated and predetermined in a manufacturing test process or a fingerprint registration process. Details of generating the moire pattern image may be shown and described in the following. In Step S200, during a manufacturing test processor or a fingerprint registration process, the image processing circuit 32 sends a high resolution fingerprint image capturing command CMDH to the fingerprint sensing circuit 30 via the transmission interface 332. The control circuit 306 receives the high resolution fingerprint image capturing command CMDH via the transmission interfaces 308. In response to the high resolution fingerprint image capturing command CMDH, the fingerprint sensing circuit 30 is configured to perform a second fingerprint sensing operation to obtain a second fingerprint image (referred to as $P_{high}$ shown FIG. 7) with high resolution. The second fingerprint sensing operation is operated in the manufacturing test processor or the fingerprint registration process for generating the moire pattern image. In the second fingerprint sensing operation, the control circuit 306 controls the pixel array 302 and the readout circuit 304 to generate the second fingerprint image with high resolution according to a high resolution image capturing timing scheme, and the high resolution image capturing timing scheme is regarding to the control signals provided by the control unit 306 to make pixel array 302 and the readout circuit 304 generate the high resolution first fingerprint image. Also referred to FIG. 11, for the pixel binning block when the binning is turned off, the control unit 306 may provide a reset signal rst[ ] having sequentially pulses for each pixel of the pixel binning block and provide a plurality of transfer gate control signals tx[ ] which sequentially turn on the transfer switches the aforementioned control signals to control all pixel circuits of the pixel binning block. Besides, the control unit 306 may provide other control signals regarding to sampling rate to the readout circuit 304. The control circuit 306 may provide other control signals regarding to sampling rate to the readout circuit 304. Under the control of the control circuit 306, the pixel array 302 acquires and converts the reflected light to generate pixel voltage signals. The readout circuit 304 converts the pixel voltage signals into the second fingerprint image with high resolution. The image resolution of the second fingerprint image may be greater than the image resolution of the first fingerprint image obtained in Step S100. The image resolution of the second fingerprint image may be a maximum resolution that the pixel array 302 is capable to achieve at most.

In Step S202, the second fingerprint image with high resolution is transmitted to the image processing circuit 32 via the transmission interfaces 308 and 332. In Step S204, the pattern image generating circuit 322 receives the second fingerprint image via the transmission interfaces 332. The pattern image generating circuit 322 is configured to generate a moire pattern image (referred to as $P_{moire}$ shown FIG. 7) according to the second fingerprint image. After receiving the second fingerprint image which is generated by a first sampling rate $f_{s1}$, the pattern image generating circuit 322 performs a Fourier transform on the second fingerprint image to generate a transformed fingerprint image. The Fourier transform may be a two-dimensional discrete Fourier Transform (DFT2), but not limited thereto. The transformed fingerprint image represented by a power spectrum of spatial frequency domain may be shown in the part (a) of FIG. 8 (upper left side of FIG. 8), including a peak power at a spatial frequency $f_{finger}$ regarding to a fingerprint pattern and another peak power at a spatial frequency $f_p$ regarding to a lattice interference pattern, higher than the spatial frequency $f_{finger}$. The lattice interference pattern results in the moire pattern.

Figure 8:
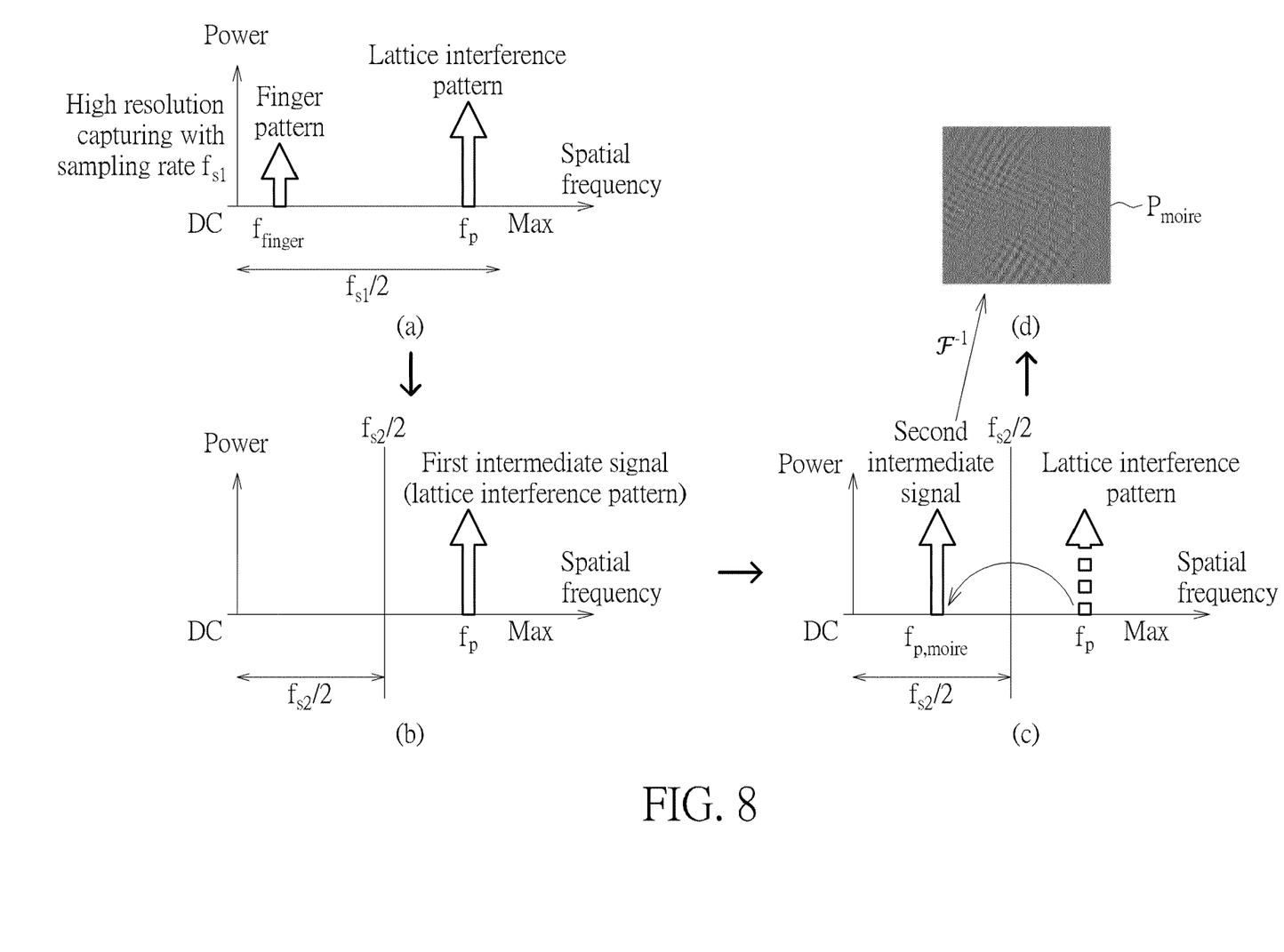
FIG. 8 is a schematic diagram illustrating operations of generating a moire pattern image according to an embodiment of the present invention.

The pattern image generating circuit 322 extracts and obtains signal contents at spatial frequencies higher than one half of a second sampling rate $f_{s2}$ for acting as a first intermediate signal as shown in the part (b) of FIG. 8 (bottom left side of FIG. 8). The second sampling rate $f_{s2}$ is configured to be smaller than the first sampling rate $f_{s1}$. In an embodiment, the pattern image generating circuit 322 may obtain the first intermediate signal by directly extracting signal contents at spatial frequencies above one half of the second sampling rate $f_{s2}$. In another embodiment, signal contents at spatial frequencies at or below one half of the second sampling rate $f_{s2}$ may be filtered out by the pattern image generating circuit 322, such that signal contents at spatial frequencies above one half of the second sampling rate $f_{s2}$ may be reserved for acting as the first intermediate signal. In another embodiment, the pattern image generating circuit 322 receives a plurality of first fingerprint images generated by the first sampling rate from the fingerprint sensing circuit 30 and performs Fourier transform on the plurality of first fingerprint images to generate a plurality of transformed first fingerprint images at the first sampling rate. The pattern image generating circuit 322 calculates an average of the plurality of the transformed first fingerprint images to generate a calculation result for acting as the first intermediate signal.

Further, as shown in the part (c) of FIG. 8 (bottom right side of FIG. 8), the pattern image generating circuit 322 is configured to produce a mirror symmetry of the first intermediate signal (of the spatial frequency $f_p$) with respect to a half of the second sampling rate to generate a second intermediate signal at a spatial frequency of $f_{p,moire}$ shown in the part (c) FIG. 8. The pattern image generating circuit 322 is configured to perform an inverse Fourier transform on the second intermediate signal to generate a moire pattern image $P_{moire}$ as shown in the part (d) of FIG. 8 (upper right side of FIG. 8). The moire pattern image obtained in Step S204 and the first fingerprint image obtained in Step S100 have the same image resolution.

In Step S206, the moire pattern image may be stored into the storage circuit 330 for the following unlocking process. The moire pattern image may be predetermined before an unlocking process. The moire pattern image which is generated in the lattice pattern may be generated by capturing the second fingerprint image with high resolution sampling before an unlocking process. The procedure 6 may be utilized to obtain a moire pattern image before the procedure 4 is executed. Moreover, the moire pattern image obtained in the step S206 may be applied to the procedure 4 for acting as the moire pattern image used in the step S104. Therefore, Steps S200, S202, S204 and S206 of FIG. 6 may be executed in the manufacturing test process or the fingerprint registration process for generating moire pattern image for the following unlocking process. Steps S100, S102, S104, S106 and S108 of FIG. 4 may be executed in the unlocking process by using the moire pattern image stored in the storage circuit 330 for fast and quickly unlocking the fingerprint recognition device.

Figure 9:
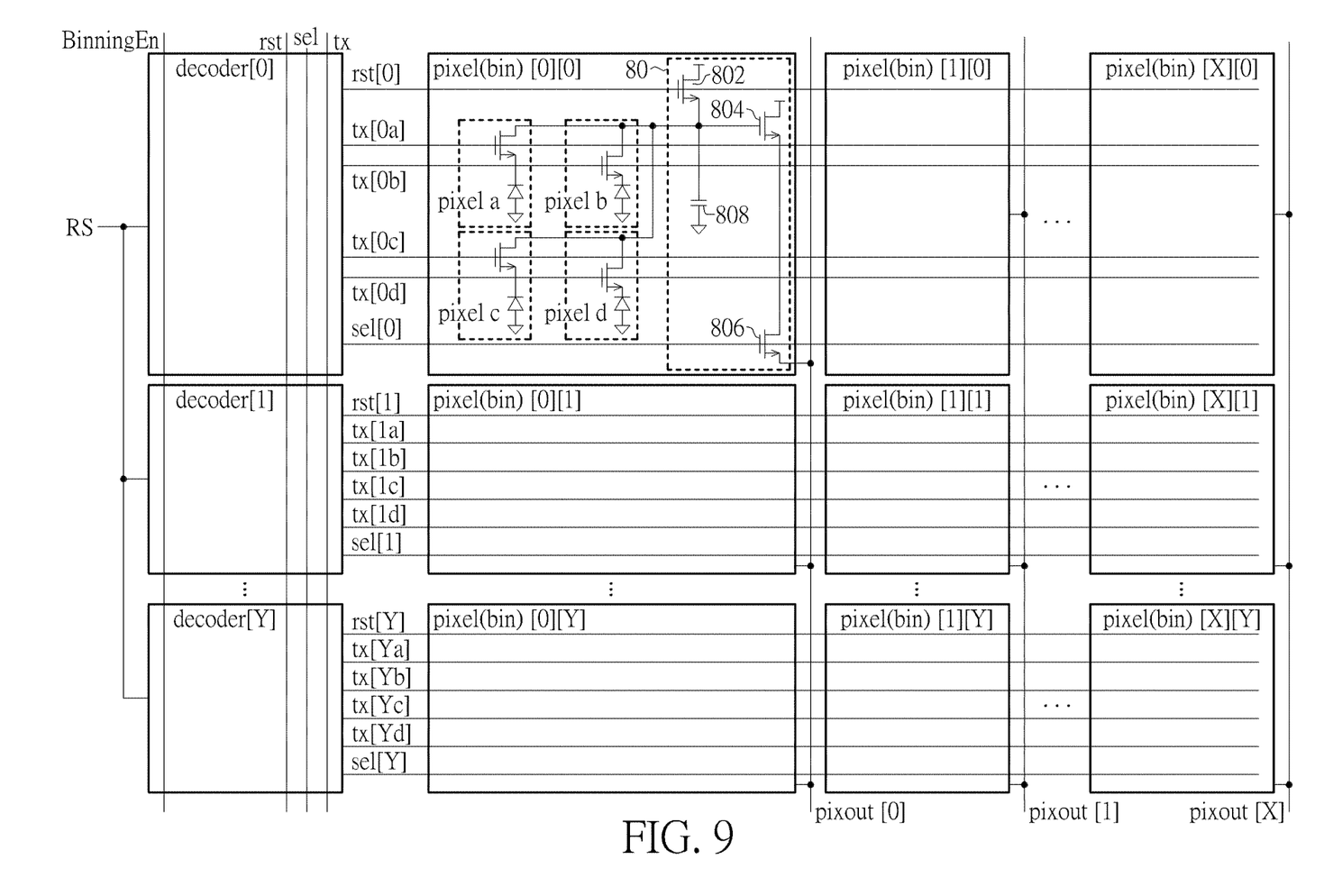
FIG. 9 is a schematic diagram of a pixel binning circuit of the readout circuit shown in FIG. 3 according to an embodiment of the present invention.

Moreover, the fingerprint sensing circuit 30 may utilize a pixel binning method for generating the first fingerprint image with low resolution. For example, in response to a low resolution fingerprint image capturing command, the readout circuit 304 of the fingerprint sensing circuit 30 may perform a first fingerprint sensing operation to obtain a first fingerprint image with low resolution in a pixel binning operation mode. In response to a high resolution fingerprint image capturing command, the readout circuit 304 of the fingerprint sensing circuit 30 may perform a second fingerprint sensing operation to obtain a second fingerprint image with high resolution in a non-pixel binning operation mode. Please refer to FIG. 9 is a schematic diagram of a pixel binning circuit of the readout circuit 304 shown in FIG. 3 according to an embodiment of the present invention. Take a 2×2 analog pixel binning for illustration, the pixel array 302 may be divided into a plurality of binning block. Each binning block includes four pixels. For example, in a binning block pixel(bin) [0] [0], pixels a, b, c and d are arranged in two rows and two columns and controlled by transfer gate control signals tx[0a], tx[0b], tx[0c] and tx[0d], respectively. Row address decoders r[0] to r[Y] are controlled to select the lines for pixel value readout in response to a binning mode enable signal BinningEn, a row address selection signal RS and reset signals rst, transfer gate control signals tx and selection signals sel. For example, for the binning block pixel (bin) [0][0], the readout circuit 304 of the fingerprint sensing circuit 30 includes a pixel binning circuit 80. The pixel binning circuit 80 includes a reset switch 802, a source follow switch 804, a selection switch 806 and a capacitor 808. The interconnections between components of the pixel binning circuit 80 and the pixels a, b, c and d are as shown in FIG. 9. For each binning block, the readout circuit 304 includes a pixel binning circuit has the same circuit structure as the pixel binning circuit 80 of the binning block pixel (bin)[0] [0].

Figure 10:
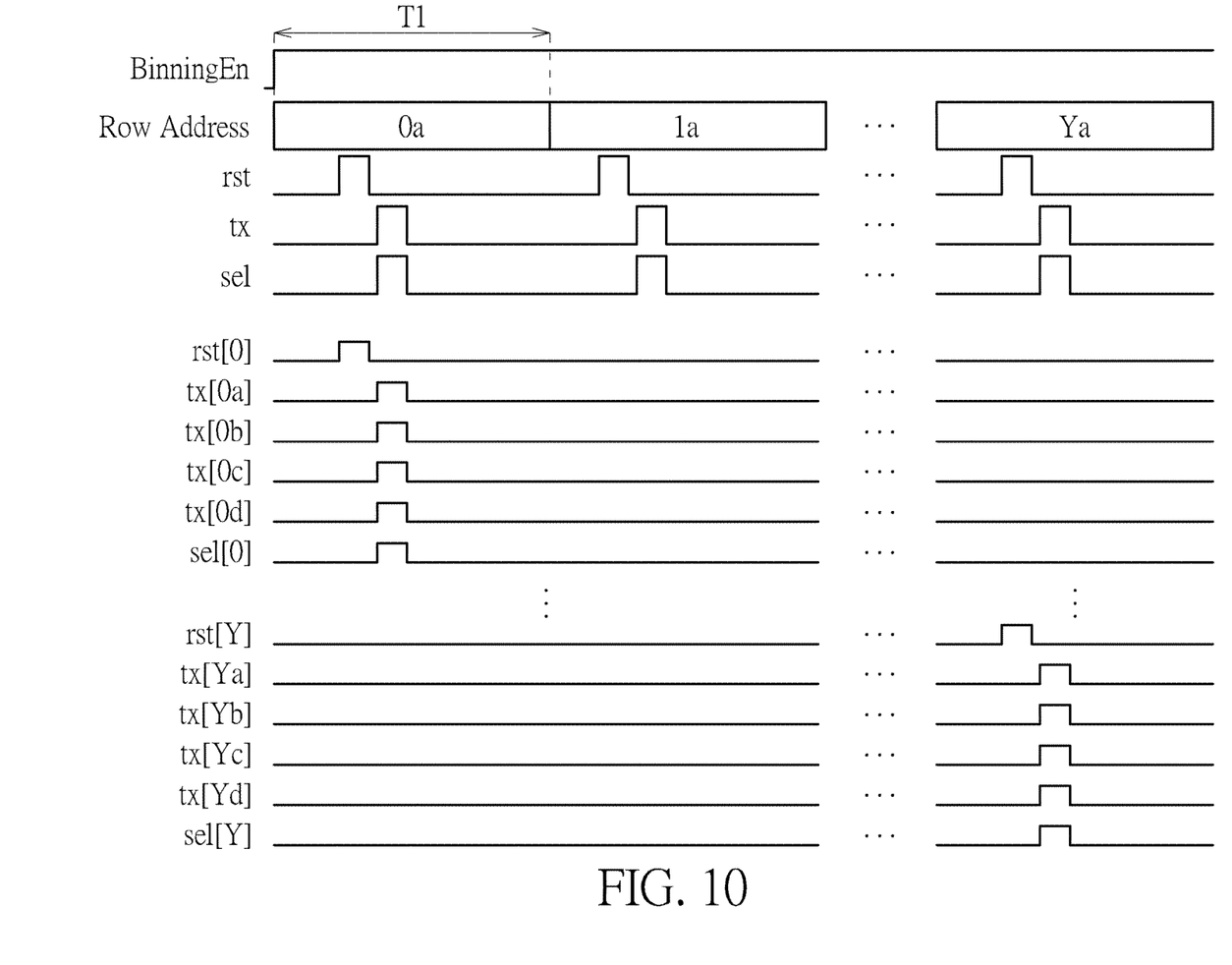
FIG. 10 is a waveform diagram of the operations of the pixel binning circuit of the readout circuit shown in FIG. 9 operating in a pixel binning operation mode according to an embodiment of the invention.

In response to a low resolution fingerprint image capturing command, the readout circuit 304 may perform a first fingerprint sensing operation to obtain a first fingerprint image in a pixel binning operation mode. Please further refer to FIG. 9 and FIG. 10. FIG. 10 is a waveform diagram of the operations of the pixel binning circuits of the readout circuit 304 shown in FIG. 9 operating in the pixel binning operation mode according to an embodiment of the invention. For example, in Step S100 of FIG. 4, when the fingerprint recognition device 3 operates in an unlocking process for unlocking, the readout circuit 304 enters into a pixel binning operation mode according to the binning mode enable signal BinningEn. At the beginning of a period T1 shown in FIG. 10, the binning mode enable signal BinningEn goes from low to high so as to configure the pixel binning circuits of the readout circuit 304 to operate in the pixel binning operation mode. During the period T1 of the pixel binning operation mode, the row address decoder r[0] is activated by the row address selection signal RS. The reset switch 802 of the pixel binning circuit 80 is activated to reset a floating diffusion node under control of a reset signal rst[0]. After that, the transfer gate control signals tx[0a], tx[0b], tx[0c] and tx[0d] are simultaneously changed to high level so as to activate the pixels a, b, c and d. Meanwhile, a selection signal sel[0] is also changed to high level and thus, the selection switch 806 is turned on. The charges accumulated in the pixels a, b, c and d may be transferred to the floating diffusion node and the pixel voltages of the pixels a, b, c and d may be binned. Since the selection switch 806 is turned on, an output line pixout[0] is connected to the selection switch 806 to allow pixel voltage signals for the pixels a, b, c and d to be binned and read out. The pixel voltage corresponding to the pixels a, b, c and d may be read out through the output line pixout[0]. As such, the pixel voltages read out through the output lines may be provided to other components of the readout circuit 304, such as a CDS circuit, an AFE circuit and an ADC converter, for converting the pixel voltages into the first fingerprint image provided to the image processing circuit 32.

Therefore, during the pixel binning operation mode, the pixel binning circuits of the readout circuit 304 may combine pixel voltages from the pixel array 302 to produce the first fingerprint image with low resolution. The image resolution of the first fingerprint image may be less than a native resolution of the pixel array 302. The image resolution of the first fingerprint image generated in the pixel binning operation mode may be less than the image resolution of the second fingerprint image generated in the non-pixel binning operation mode. Since the first fingerprint image is a low resolution image, the fingerprint sensing circuit 30 may operate at a lower sampling rate for capturing the first fingerprint image without operating at a very high sampling rate and spending a longer sampling time. The simultaneous binning of pixel voltage signal may reduce operation time of the CDS circuit, the AFE circuit and the ADC converter AFE in the readout circuit 304. As a result, in the unlocking process, the embodiments of the invention may use the analog pixel binning technology to rapidly obtain the first fingerprint image with low resolution and read the moire pattern image stored in the storage circuit 330 so as to generate the de-moire fingerprint image with low moire pattern or moire-pattern-free for fingerprint recognition.

Figure 11:
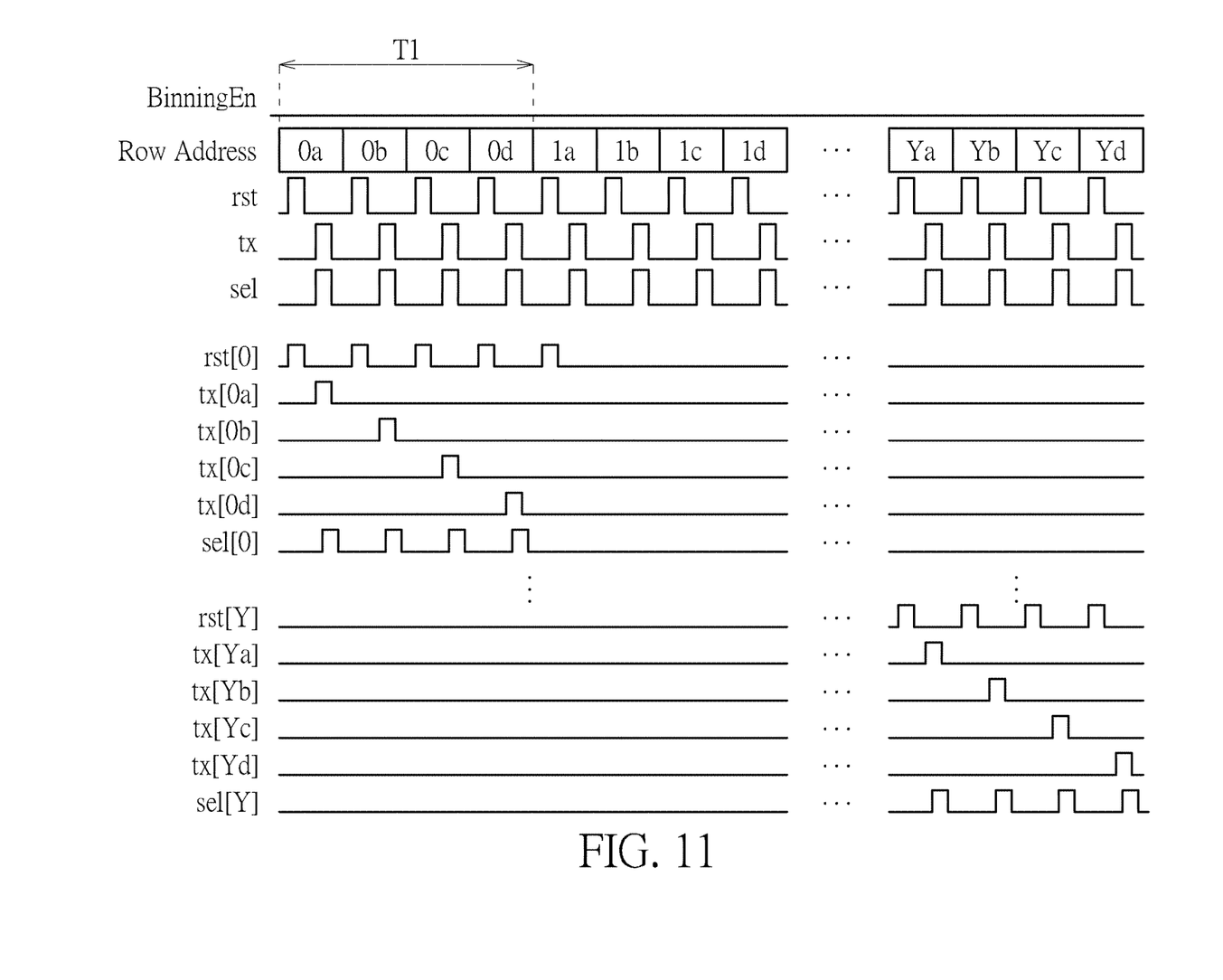
FIG. 11 is a waveform diagram of the operations of the pixel binning circuit of the readout circuit shown in FIG. 9 operating in a non-pixel binning operation mode according to an embodiment of the invention.

In response to a high resolution fingerprint image capturing command, the readout circuit 304 may perform a second fingerprint sensing operation to obtain a second fingerprint image in a non-pixel binning operation mode. Please further refer to FIG. 9 and FIG. 11. FIG. 11 is a waveform diagram of the operations of the pixel binning circuits of the readout circuit 304 shown in FIG. 9 operating in the non-pixel binning operation mode according to an embodiment of the invention. For example, in Step S200 of FIG. 6, the fingerprint sensing circuit 30 is configured to perform a second fingerprint sensing operation to obtain a second fingerprint image with high resolution for generating the moire pattern image during a manufacturing test processor or a fingerprint registration process. Under such a situation, the fingerprint sensing circuit 30 may enter into a non-pixel binning operation mode according to the binning mode enable signal BinningEn. At the beginning of a period T1 shown in FIG. 11, the binning mode enable signal BinningEn is low so as to configure the pixel binning circuits of the readout circuit 304 to operate in the non-pixel binning operation mode. During the period T1 of the pixel binning operation mode, the row address decoder r[0] is activated by the row address selection signal RS. The reset switch 802 of the pixel binning circuit 80 is activated according to the reset signal rst[0].

The transfer gate control signals tx[0a], tx[0b], tx[0c] and tx[0d] are sequentially changed to high level such that the pixels a, b, c and d are sequentially activated. Accordingly, the pixels a, b, c and d are read out one by one individually. During the period T1, the transfer gate control signal tx[0a] and the selection signal sel[0] are enabled, the pixel a and the selection switch 806 are activated and a pixel voltage corresponding to the pixel a may be read out through the output line pixout[0]. After that, The transfer gate control signals tx[0b] and the selection signal sel[0] are enabled, the pixel b and the selection switch 806 are activated and a pixel voltage corresponding to the pixel b may be read out through the output line pixout[0]. Such like this, pixel voltages corresponding to the pixels a, b, c and d may be sequentially read out through the output line pixout[0].

During the non-pixel binning operation mode, pixel voltages of the pixel array 302 may be read out pixel by pixel without binning to produce the second fingerprint image with high resolution. The image resolution of the second fingerprint image may be a resolution that the pixel array 302 is capable to achieve at most. The image resolution of the second fingerprint image generated in the non-pixel binning operation mode may be greater than the image resolution of the first fingerprint image generated in the pixel binning operation mode.

To sum up, the embodiments of the present invention may remove the moire effect in the first fingerprint image to provide the de-moire fingerprint image with low moire pattern or moire-pattern-free, thus realizing an accurate and reliable fingerprint recognition function for unlocking process. More particularly, since the first fingerprint image with low resolution is captured without high sampling rate and long sampling time during the unlocking process, the required image capturing time and power consumption may be significantly reduced. The data amount to be transmitted between the transmission interfaces of the fingerprint sensing circuit and the image processing circuit becomes less, and the data transmission time is also reduced during the unlocking process. Therefore, the embodiments of the present invention not only provides an accurate and reliable fingerprint recognition, but also provide a more faster unlocking operation, thus facilitating a better user experience during the unlocking process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A fingerprint recognition device, comprising:
a fingerprint sensing circuit, configured to perform a first fingerprint sensing operation to obtain a first fingerprint image; and
an image processing circuit, coupled to the fingerprint sensing circuit and configured to perform a fingerprint recognition process according to a de-moire fingerprint image, wherein the image processing circuit comprises:
an interference ratio calculation circuit, coupled to the fingerprint sensing circuit, and configured to calculate an interference ratio according to the first fingerprint image and a moire pattern image; and
an interference cancellation circuit, coupled to the interference ratio calculation circuit and the fingerprint sensing circuit, and configured to generate the de-moire fingerprint image according to the first fingerprint image, the interference ratio and the moire pattern image.

2. The fingerprint recognition device of claim 1, wherein the fingerprint sensing circuit comprises pixel binning is utilized in the first fingerprint sensing operation for generating the first fingerprint image.

3. The fingerprint recognition device of claim 1, wherein the interference ratio calculation circuit is configured to perform a correlation operation on the first fingerprint image and the moire pattern image to generate the interference ratio.

4. The fingerprint recognition device of claim 3, wherein the interference ratio is calculated by the interference ratio calculation circuit according to the following equation:

$$K_{(moire)} = \frac{\sum_{i=1}^{n}\sum_{j=1}^{m} P_{(low)i,j} * P_{(moire)i,j}}{\sum_{i=1}^{n}\sum_{j=1}^{m} P_{(moire)i,j} * P_{(moire)i,j}}$$

where $K_{(moire)}$ represents the interference ratio; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; and i, j, n and m are positive integers.

5. The fingerprint recognition device of claim 3, wherein the interference ratio is calculated by the interference ratio calculation circuit according to the following equation:

$$K_{(moire)} = N * \sum_{i=1}^{n}\sum_{j=1}^{m} P_{(low)i,j} * P_{(moire)i,j}$$

where $K_{(moire)}$ represents the interference ratio; N represents a first coefficient; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; and i, j, n and m are positive integers.

6. The fingerprint recognition device of claim 1, wherein for each pixel of the de-moire fingerprint image, the interference cancellation circuit calculates a difference between a pixel value of a corresponding pixel of the first fingerprint image and a product of the interference ratio and a pixel value of the corresponding pixel of the moire pattern image to obtain a pixel value of the each pixel of the de-moire fingerprint image.

7. The fingerprint recognition device of claim 1, wherein the first fingerprint sensing operation is operated in an unlocking process for unlocking the fingerprint recognition device.

8. The fingerprint recognition device of claim 1, wherein the fingerprint sensing circuit is further configured to perform a second fingerprint sensing operation to obtain a second fingerprint image and the image processing circuit is configured to generate the moire pattern image according to the second fingerprint image, wherein the image resolution of the second fingerprint image is greater than the image resolution of the first fingerprint image, and the moire pattern image and the first fingerprint image have the same image resolution.

9. The fingerprint recognition device of claim 8, wherein the second fingerprint sensing operation is performed by the fingerprint sensing circuit in a manufacturing test process or a fingerprint registration process.

10. The fingerprint recognition device of claim 8, wherein the image processing circuit comprises:
a pattern image generating circuit, configured to perform a Fourier transform on the second fingerprint image to generate a transformed fingerprint image at a first sampling rate, obtain signal contents of the transformed fingerprint image at frequencies above one half of a second sampling rate as a first intermediate signal, wherein the second sampling rate is smaller than the first sampling rate, the pattern image generating circuit is configured to mirror the first intermediate signal about half of the second sampling rate to generate a second intermediate signal, and perform an inverse Fourier transform on the second intermediate signal to generate the moire pattern image.

11. A fingerprint recognition method, for a fingerprint recognition device, comprising:
performing a first fingerprint sensing operation to obtain a first fingerprint image;
calculating an interference ratio according to the first fingerprint image and a moire pattern image; and
generating the de-moire fingerprint image according to the first fingerprint image, the interference ratio and the moire pattern image; and
performing a fingerprint recognition process according to the de-moire fingerprint image.

12. The fingerprint recognition method of claim 11, wherein the step of performing the first fingerprint sensing operation to obtain the first fingerprint image comprises:
performing the first fingerprint sensing operation by using pixel binning to obtain the first fingerprint image.

13. The fingerprint recognition method of claim 11, wherein the step of calculating the interference ratio according to the first fingerprint image and the moire pattern image comprises:
performing a correlation operation on the first fingerprint image and the moire pattern image to generate the interference ratio.

14. The fingerprint recognition method of claim 13, wherein the step of calculating the interference ratio according to the first fingerprint image and the moire pattern image determines the interference ratio according to the following equation:

$$K_{(moire)} = \frac{\sum_{i=1}^{n}\sum_{j=1}^{m} P_{(low)i,j} * P_{(moire)i,j}}{\sum_{i=1}^{n}\sum_{j=1}^{m} P_{(moire)i,j} * P_{(moire)i,j}}$$

where $K_{(moire)}$ represents the interference ratio; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; and i, j, n and m are positive integers.

15. The fingerprint recognition method of claim 13, wherein the step of calculating the interference ratio according to the first fingerprint image and the moire pattern image determines the interference ratio according to the following equation:

$$K_{(moire)} = N * \sum_{i=1}^{n}\sum_{j=1}^{m} P_{(low)i,j} * P_{(moire)i,j}$$

where $K_{(moire)}$ represents the interference ratio; N represents a first coefficient; $P_{(low)i,j}$ represents a pixel value of a pixel at the i-th row and j-th column of the first fingerprint image; $P_{(moire)i,j}$ represents a pixel value of a pixel at the i-th row and j-th column of the moire pattern image; and i, j, n and m are positive integers.

16. The fingerprint recognition method of claim 11, wherein the step of generating the de-moire fingerprint image according to the first fingerprint image, the interference ratio and the moire pattern image comprises:
for each pixel of the de-moire fingerprint image, calculating a difference between a pixel value of a corresponding pixel of the first fingerprint image and a product of the interference ratio and a pixel value of the corresponding pixel of the moire pattern image to obtain a pixel value of the each pixel of the de-moire fingerprint image.

17. The fingerprint recognition method of claim 11, wherein the first fingerprint sensing operation is operated in an unlocking process for unlocking the fingerprint recognition device.

18. The fingerprint recognition method of claim 11, further comprising:

performing a second fingerprint sensing operation to obtain a second fingerprint image; and generating the moire pattern image according to the second fingerprint image, wherein the image resolution of the second fingerprint image is greater than the image resolution of the first fingerprint image, and the moire pattern image and the first fingerprint image have the same image resolution.

19. The fingerprint recognition method of claim 18, wherein the second fingerprint sensing operation is performed by a fingerprint sensing circuit in a manufacturing test process or a fingerprint registration process.

20. The fingerprint recognition method of claim 18, wherein the step of generating the moire pattern image according to the second fingerprint image comprises:

performing a Fourier transform on the second fingerprint image to generate a transformed fingerprint image at a first sampling rate;

obtaining signal contents of the transformed fingerprint image at frequencies above one half of a second sampling rate as a first intermediate signal, wherein the second sampling rate is smaller than the first sampling rate;

mirroring the first intermediate signal about half of the second sampling rate to generate a second intermediate signal; and performing an inverse Fourier transform on the second intermediate signal to generate the moire pattern image.

21. A method of generating a moire pattern image, comprising:

receiving a fingerprint image from a fingerprint sensing circuit;

performing a Fourier transform on the fingerprint image to generate a transformed fingerprint image at a first sampling rate;

obtaining signal contents of the transformed fingerprint image at frequencies above one half of a second sampling rate of the transformed fingerprint image as a first intermediate signal, wherein the second sampling rate is smaller than the first sampling rate;

mirroring the first intermediate signal about half of the second sampling rate to generate a second intermediate signal; and performing an inverse Fourier transform on the second intermediate signal to generate the moire pattern image, wherein the image resolution of the fingerprint image is greater than the image resolution of the moire pattern image.

22. The method of claim 21, wherein the step of performing the Fourier transform on the fingerprint image to generate the transformed fingerprint image at the first sampling rate comprises:

performing a two-dimensional discrete Fourier transform on the fingerprint image to generate the transformed fingerprint image at the first sampling rate.

23. The method of claim 21, wherein the step of obtaining signal contents of the transformed reference image at frequencies above one half of the second sampling rate of the transformed fingerprint image as the first intermediate signal comprises:

extracting signal contents of the transformed fingerprint image at frequencies above one half of the second sampling rate for acting as the first intermediate signal.

24. The method of claim 21, wherein the step of obtaining signal contents of the transformed fingerprint image at frequencies above one half of the second sampling rate of the transformed fingerprint image as the first intermediate signal comprises:

filtering out signal contents of the transformed fingerprint image at frequencies at or below half of the second sampling rate and reserving signal contents of the transformed fingerprint image at frequencies above half of the second sampling rate for acting as the first intermediate signal.

25. The method of claim 21, wherein the step of obtaining signal contents of the transformed fingerprint image at frequencies above one half of the second sampling rate of the transformed fingerprint image as the first intermediate signal comprises:

receiving a plurality of first fingerprint images from the fingerprint sensing circuit;

performing the Fourier transform on the plurality of first fingerprint images to generate a plurality of transformed first fingerprint images at the first sampling rate; and calculating an average of the transformed fingerprint image and the plurality of the transformed first fingerprint images to generate a calculation result for acting as the first intermediate signal.

\* \* \* \* \*